United States Patent
Paulraj et al.

(10) Patent No.: US 12,541,623 B2
(45) Date of Patent: Feb. 3, 2026

(54) SYNCHRONIZATION OF SYSTEM TIME AMONG SMART DEVICES VIA SECURITY PROTOCOL DATA MODEL (SPDM)

(71) Applicant: Dell Products, L.P., Round Rock, TX (US)

(72) Inventors: Deepaganesh Paulraj, Bangalore (IN); Lee E. Ballard, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 377 days.

(21) Appl. No.: 18/176,815

(22) Filed: Mar. 1, 2023

(65) Prior Publication Data

US 2024/0296255 A1   Sep. 5, 2024

(51) Int. Cl.
*G06F 21/72* (2013.01)
*G06F 21/33* (2013.01)
*G06F 21/85* (2013.01)

(52) U.S. Cl.
CPC .............. *G06F 21/85* (2013.01); *G06F 21/33* (2013.01); *G06F 21/725* (2013.01)

(58) Field of Classification Search
None
See application file for complete search history.

(56) References Cited

U.S. PATENT DOCUMENTS

| | | | |
|---|---|---|---|
| 2018/0019999 A1* | 1/2018 | Naegle | H04L 63/0823 |
| 2021/0203670 A1* | 7/2021 | Woodland | G06F 21/725 |
| 2022/0124118 A1* | 4/2022 | Bangalore Sathyanarayana | ......... H04L 63/1416 |

* cited by examiner

*Primary Examiner* — Nelson S. Giddins
(74) *Attorney, Agent, or Firm* — Fogarty LLP (57) ABSTRACT

Systems and methods provide an Information Handling System (IHS) comprising a host processor module configured to host one or more processors and two or more smart devices, a secure control module configured to host a baseboard management controller, and a secure control interface configured to support communication between the secure control module and the host processor module. The baseboard management controller is configured to retrieve a current time from each of the smart devices, validate the current time for each of the smart devices, identify a selected current time to be applied to each of the smart devices, and send the selected current time to each of the smart devices. The baseboard management controller is a Security Protocol and Data Model (SPDM)-enabled device that uses SPDM messages to synchronize time across IHS components.

20 Claims, 4 Drawing Sheets

SYNCHRONIZATION OF SYSTEM TIME AMONG SMART DEVICES VIA SECURITY PROTOCOL DATA MODEL (SPDM)

BACKGROUND

The Open Compute Project's (OCP) Datacenter-Modular Hardware System (DC-MHS) sub-project is directed to interoperability between elements of datacenter, edge, and enterprise infrastructure. DC-MHS provides consistent interfaces and form factors among modular building blocks. DC-MHS standardizes a collection of form-factors and supporting ingredients to allow interoperability between different platforms. The Security Protocol and Data Model (SPDM) specification defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

SUMMARY

Embodiments are directed to providing unified system time synchronization among smart devices in a DC-MHS environment via SPDM messages sent by a Baseboard Management Controller (BMC). System time negotiation and selection are based on the precision and availability of times set on different devices. An algorithm may be used to autocorrect and synchronize the time differences that are introduced due to the forward propagation delay of set-time requests and due to processing time.

Systems and methods provide an Information Handling System (IHS) comprising a host processor module configured to host one or more processors and two or more smart devices, a secure control module configured to host a baseboard management controller, and a secure control interface configured to support communication between the secure control module and the host processor module. The baseboard management controller is configured to retrieve a current time from each of the smart devices, validate the current time for each of the smart devices, identify a selected current time to be applied to each of the smart devices, and send the selected current time to each of the smart devices. The baseboard management controller is a Security Protocol and Data Model (SPDM)-enabled device that uses SPDM messages to synchronize time across IHS components.

A selected current time is used to synchronize each of the smart devices. Each of the smart devices is coupled to a time source that provides the current time that smart device. The time source for each smart device is selected from a Real-Time Clock (RTC), a Network Time Protocol (NTP) server, a Global Navigation Satellite System (GNSS), and PTP (Precision Time Protocol) system.

The baseboard management controller sends SPDM GET_CERTIFICATE messages to collect a hardware identity for each smart device and sends SPDM GET_CAPABILITIES message to identify a time source for each smart device. The baseboard management controller sends SPDM GET_ENCAPSULATED_REQUEST request messages to set a system time on each smart device.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Modular server architectures give cloud service providers a variety of compute choices to meet market and business conditions, to offer flexible configurations, and to deliver innovative solutions. The Datacenter-Modular Hardware System (DC-MHS) provides interoperability between datacenter, edge, and enterprise infrastructure using consistent interfaces and modular building blocks. DC-MHS standardizes various Host Processor Module (HPM) form factors and provides supporting elements for interoperability of HPMs across various platforms. The HPM is managed by a Datacenter-Secure Control Module (DC-SCM), which is designed to enable a common management and security infrastructure across platforms within a data center. The interface between the DC-SCM and the HPM is referred as the Datacenter-Secure Control Interface (DC-SCI).

The HPM is a traditional CPU-memory device with the Baseboard Management Controllers (BMC) and security functions moved to the DC-SCM. HPMs are not limited to a standard processor architecture and can apply any processor architecture utilizing management and security features.

Figure 1:
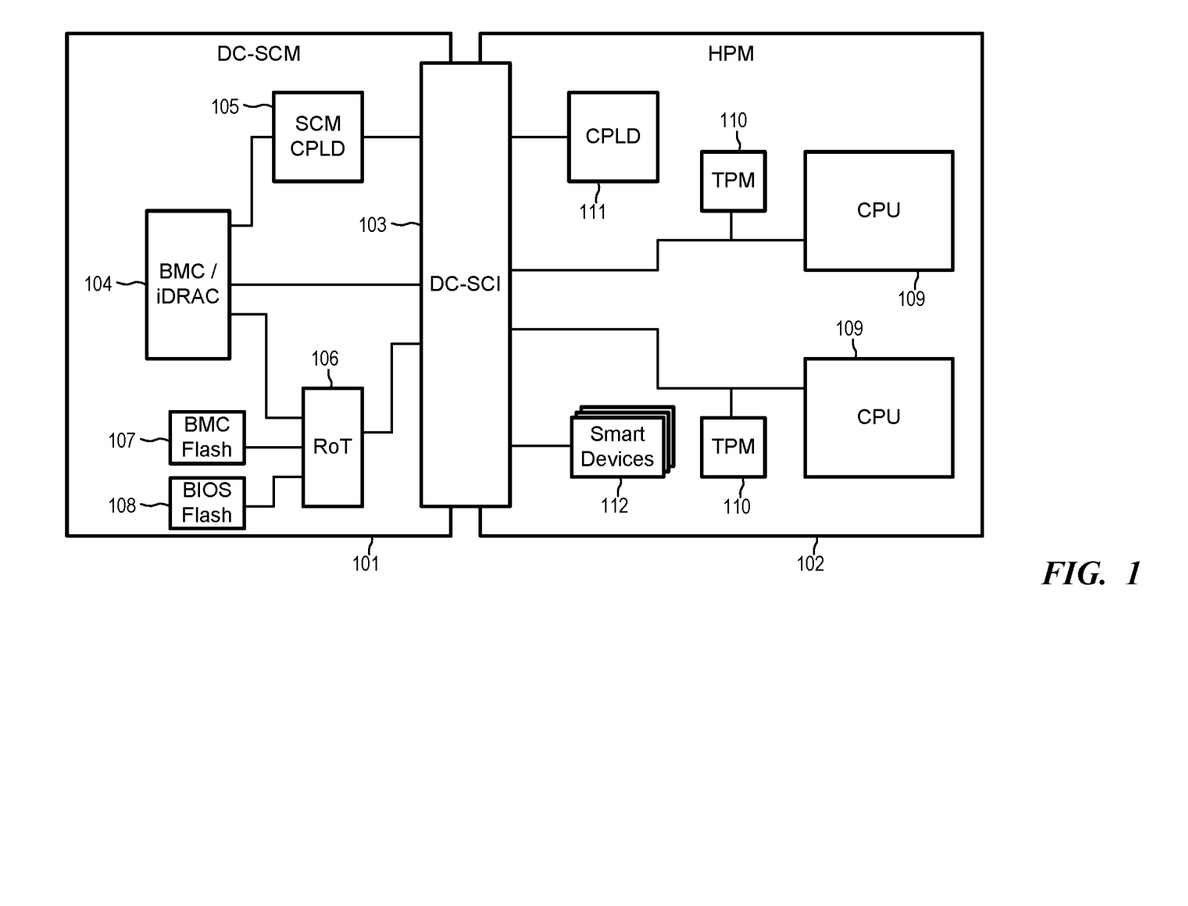
FIG. 1 is a block diagram illustrating multi-node building blocks of a Datacenter-Modular Hardware System.

FIG. 1 is a block diagram illustrating multi-node building blocks of a DC-MHS. DC-SCM 101 is coupled to HPM 102 via DC-SCI 103. The DC-SCM 101 consists of a BMC 104, which is a specialized service processor that monitors the physical state of the server. As a non-limiting example of a BMC 104, the integrated Dell Remote Access Controller (iDRAC) from DELL, INC. is embedded within DELL® PowerEdge servers and provides functionality that helps information technology (IT) administrators at a remote operations centers deploy, update, monitor, and maintain servers with no need for any additional software to be installed.

A complex programmable logic device (DC-SCM CPLD) 105 contains application specific logic and a high-speed and scalable Low-voltage differential signaling Tunneling Protocol & Interface (LTPI). A Roots of Trust (RoT) Security Processor 106 is responsible for attesting the BMC, BIOS, and/or other firmware images on the system. BMC Flash 107 consists of one or more flash devices used to contain the BMC firmware image. BIOS Flash 108 consist of one or more flash devices used to contain the BIOS firmware image for each node.

HPM 102 represents a general form factor that allows for maximum input/output (I/O) of CPUs 109 in the accessible slots. The HPM 102 form factor does not require a specific CPU 109 or memory technology. Various HPM 102 form factors support different numbers of CPUs. The HPM specifications are adapted to allow multiple generations of compute core designs to fit into the form factor specification so that chassis and system designs can be reused as desired.

Trusted Platform Modules (TPM) 110 provide hardware-based, security-related functions for CPUs 109 through integrated cryptographic keys. CPLD 111 supports data exchange between DC-SCM CPLD 105 and HPM 102 using LPTI. In other configurations, HPM 102 may include other hardware components (not shown), such as memory devices, graphics processing units (GPU), peripheral I/O, etc.

HPM 102 may also include one or more smart devices 112, such as a Smart Network Interface Card (NIC), which is a programable device used to improve data center networking performance, security, features, and flexibility. Other smart devices 112 may include, for example, data processing units (DPU) and infrastructure processing units (IPU).

DC-MHS provides a family of specifications to enable interoperability between datacenter and enterprise infrastructure by providing consistent interfaces and form factors among modular building blocks. For example, the Open Compute Project® is developing following HPM specifications. The Modular Hardware System FulL Width Specification (M-FLW), which is an HPM form factor specification that is optimized for using the full width of a standard rack-mountable server. The Modular Hardware System Partial Width Density Optimized Specification (M-DNO), which is an HPM specification that is targeted to partial width, such as half-width or three-quarters-width, form factors.

The DC-SCM design simplifies the deployment of HPMs and increases the efficiency for time to market deployment for new systems. The DC-SCM has a standardized pinout and definition, which provides common boot, monitoring, control, and remote debug for diverse platforms.

DC-SCI 103 supports several PCIe bus options between DC-SCM 101 and HPM 102, including PCIe Gen 2.0 up to PCIe Gen 5.0×1 interface, SPI interfaces, NC-SI RMII-based transport (RBT) interface, LTPI, eSPI bus, and I2C/I3C bus among others.

DMTF (formerly known as the Distributed Management Task Force) creates open manageability standards including the Security Protocols and Data Models (SPDM) standard, which enables authentication, attestation, and key exchange to enable and enhance infrastructure security. SPDM defines messages, data objects, and sequences for performing message exchanges between devices over a variety of transport and physical media. The description of message exchanges includes authentication and provisioning of hardware identities, measurement for firmware identities, session key exchange protocols to enable confidentiality with integrity protected data communication and other related capabilities.

Data center administrators require components to establish trust, and to reestablish trust over time, with other components before securely communicating. SPDM provides an authentication mechanism to establish trust between two endpoints. SPDM enables the creation of a session to exchange secured messages between the endpoints. The components may include encompass a number of component types, including PCIe adapters, BMCs, authentication components, CPUs, and components that are attached over I2C or other buses. SPDM enables authentication and secure communication by retrieval of a public key certificate from a component and using a protocol to challenge the component to prove that it is the component whose identity is uniquely described by that certificate. SPDM allows retrieval of a signed measurement payload of mutable components from a component. The measurements may represent a firmware revision, component configuration, the Root of Trust for Measurements, hardware integrity, etc. SPDM provides negotiation of session keys with a component, thereby enabling secured message exchanges with that component.

The Platform Management Components Intercommunication (PMCI) working group of the DMTF prepared the Security Protocol and Data Model (SPDM) Specification (DSP0274) version 1.2.1 dated Jun. 23, 2022, defines messages, data objects, and sequences for performing message exchanges between devices over a variety of transport and physical media. The SPDM Specification sets forth a messaging protocol that defines a request-response messaging model between two endpoints to perform the message exchanges outlined in SPDM message exchanges. The content of the Security Protocol and Data Model (SPDM) Specification (DSP0274) version 1.2.1, including the SPDM message exchanges, are hereby incorporated by reference herein in its entirety.

Smart devices 112 require time for validating internal secure boot certificates. A smart device, such as a SmartNIC, may or may not have A Real-Time Clock (RTC). Even if RTC is present, the smart device needs to be in sync with rest of the systems. In one method, the BMC/iDRAC 104 configures the RTC to the device/sub system. However, there can be delays in applying the time configuration to the device/sub system. For example, in case of applying the RTC to a SmartNIC, the user has to push the RTC as a SmartNIC BIOS UEFI variable via Redfish and apply the SmartNIC reboot. The delay in the SmartNIC reboot and SmartNIC UEFI pulling the RTC value from BMC/iDRAC via Redfish and applying internally will make the RTC out of sync.

In current systems, a BMC/iDRAC 104 supports configuring an RTC based on the vendor of the smart device 112, such as by configuring the Field Programmable Gate Arrays (FPGA), configuring the BIOS UEFI attribute via Redfish, or via a Network Controller Sideband Interface (NC-SI) manufacturer command. There is no unified process or RTC configuration and management that results in difficulty and inconsistency. Smart devices require synchronized unified time to support data, log collection, and correlation. Also, any sub systems that require timely communication among themselves also require unified time among the sub systems.

Figure 2:
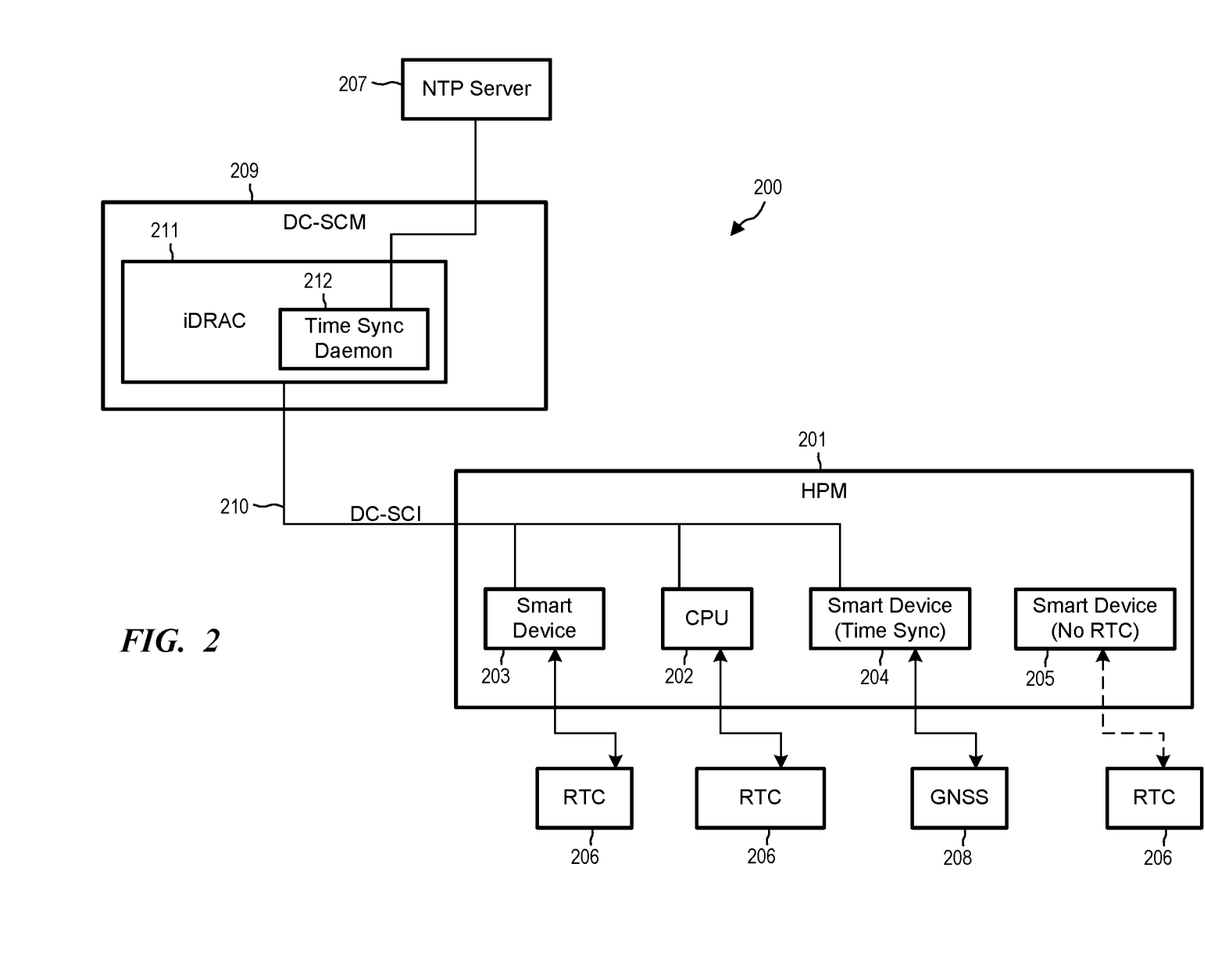
FIG. 2 is a block diagram illustrating elements of a data center system, such as components of a server or an Information Handling System.

FIG. 2 is a block diagram illustrating elements of a data center system 200, which may be components of a server or an Information Handling System (IHS), for example. HPM 201 comprises compute elements, such as a CPU 202 and various smart devices 203, 204, 205, such as Smart NICs, DPUs, and IPUs. CPU 202 and smart devices 203-205 may be coupled to one of several time sources, such as a system Real-Time Clock (RTC) 206, a Network Time Protocol (NTP) server 207, or Global Navigation Satellite System (GNSS) 208. The RTC 206 performs functions such as keeping track of current date and time and storing system data, even when the system is powered down. Different time sources may have different accuracies. Also, different components, such as different smart devices 203-205, may have better or worse connections to the time source. For example, smart device 205 may not be currently in contact with RTC 206 and, therefore, is unable to obtain the current time on its own.

HPM 201 is in communication with DC-SCM 209 via a connector, bus, or interface, such as DC-SCI 210. DC-SCM 209 includes an iDRAC 211 or other remote access controller or baseboard management controller. iDRAC 211 includes a Time Sync Daemon 212, such as a background software application or process running on iDRAC 211.

System 200 allows a data center to provide unified system time synchronization among the smart devices 203-205 in a DC-MHS environment by iDRAC 211 via SPDM messaging. As defined in the SPDM Specification, iDRAC 211 may act as a Requester endpoint that sends SPDM messages to other endpoints, such as smart devices 203-205, that act as Responders. A certificate chain is supported by SPDM. The certificate chain contains at least one certificate that includes hardware identity information. The hardware identity information should be present in a device certificate and is identified by a hardware identity object identifier.

iDRAC 211 provides system time negotiation and selection based on the precision and availability. iDRAC 211 further supports an algorithm to autocorrect and synchronize time differences introduced due to the forward propagation delays introduced by request message travel and processing time.

In an example embodiment, iDRAC 211 discovers the SDSi-capable hardware devices via SPDM messages. For example, iDRAC 211 may send SPDM GET_VERSION and GET_CAPABILITIES request messages to HPM 201 and components 202-205, which reply with corresponding VERSION and CAPABILITIES response messages. In this example, devices 203-20 are identified as smart devices, such as Smart NICs. iDRAC 211 then collects hardware identity certificates using an SPDM GET_CERTIFICATE request message that is sent to devices 203-205. The GET_CERTIFICATE request message identifies a slot to be read on a certificate chain for each device 203-205. iDRAC 211 then collects inventory information such as the availability of the RTC, PTP (Precision Time Protocol), etc. for each device. iDRAC 211 enables a connection to the NTP server 207.

After receiving the time-related inventory for each smart device 203-205, iDRAC 211 gets the current time for each device 203-205. iDRAC 211 then caches the times and activates a software time loop. iDRAC 211 validates the accuracy of the time received from each device 203-205. Based on the accuracy of the RTC 206, availability of PTP, etc., iDRAC 211 chooses a system time that should be applied across all the hardware devices. iDRAC 211 then sends the current time via SPDM messages to all of the smart hardware devices, such as devices 203-205, and allows the hardware devices to confirm the synchronization by sending SPDM messages to synchronize the system-wide time.

Figure 3:
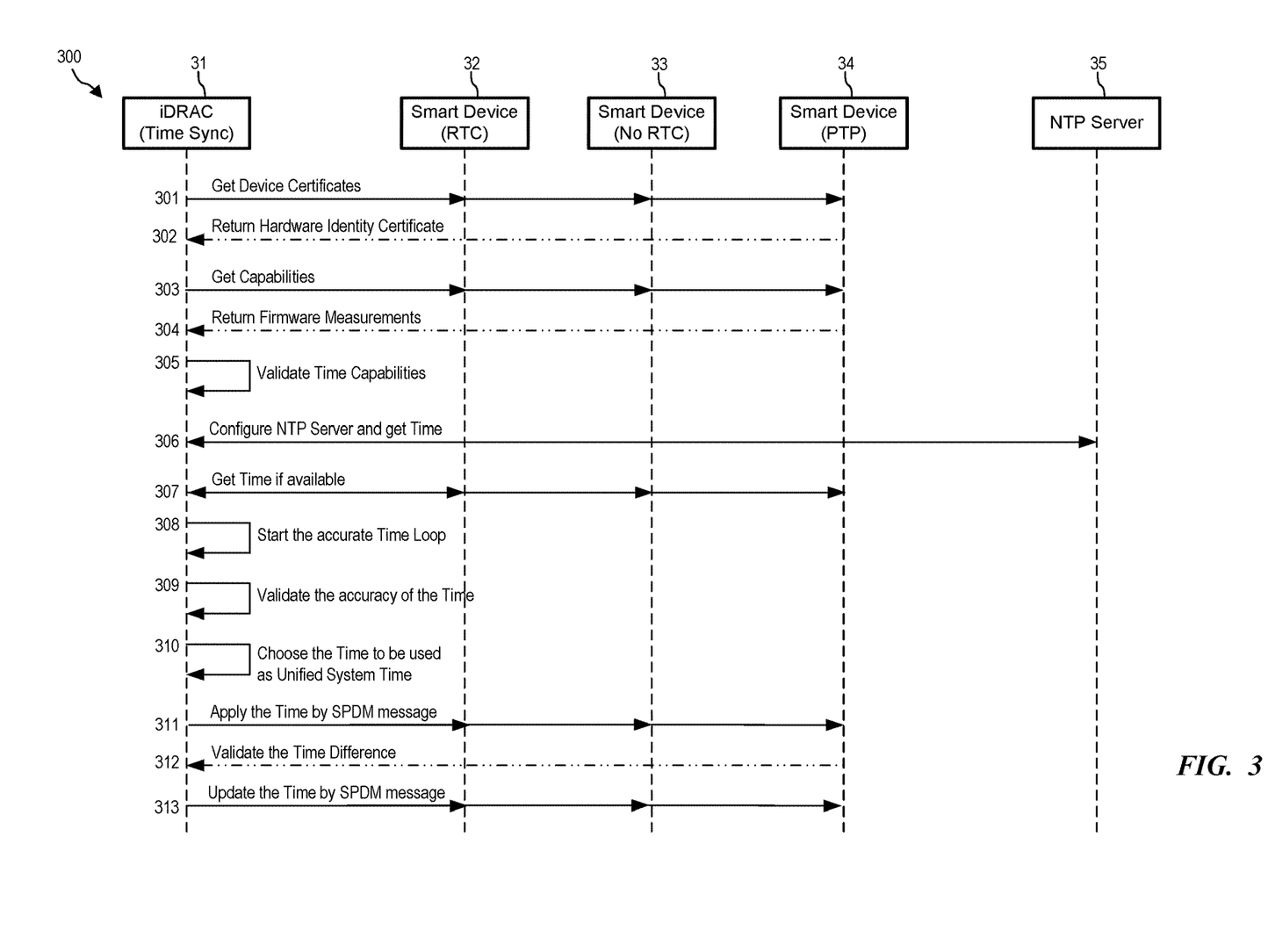
FIG. 3 illustrates a message flow that is exchanged between a BMC and various smart devices.

FIG. 3 illustrates a message flow that is exchanged between an iDRAC 31 and various smart devices 32, 33, 34. The iDRAC 31 is also in communication with an NTP server 35. In one embodiment, iDRAC 31 and smart devices 32, 33, 34 are components of a server or IHS in a data center. This message flow may include SPDM messages where iDRAC 31 acts as the Requester and smart devices 32, 33, 34 act as Responders.

Message 301 is a request from iDRAC 31 to devices 32, 33, 34 to provide device certificates. This may be an SPDM GET_CERTIFICATE message, for example, in which iDRAC 31 requests that the devices provide a certificate chain from a specified slot number. In messages 302, the devices 32, 33, 34 each return their hardware identity certificate. This may be an SPDM CERTIFICATE response message that includes an id-DMTF-hardware-identity OID along with metadata.

Message 303 is a request from iDRAC 31 to determine capabilities of each device 32, 33, 34. This may be an SPDM GET_CAPABILITIES message, for example. In response, the devices send message 304, which may include firmware metadata. The response message may be an SPDM CAPABILITIES message.

In step 305, iDRAC 31 validates the time capabilities of each device 32, 33, 34, such as the availability of RTC, PTP, etc. In step 306, iDRAC 31 configures a connection to an NTP server 35 and gets the current time. Initially, iDRAC 31 will sync time to the BIOS time until it configures to sync time to NTP server 35.

In step 307, iDRAC 31 requests the current time from each device 32, 33, 34. The devices respond with the available time, which depends upon each device's capability and configuration. For example, device 32 will respond with RTC time, and device 34 will respond with PTP time. Because device 33 is not synchronized to RTC, it will respond with a local clock time or BIOS time.

In step 308, iDRAC 31 begins a loop to determine an accurate time based upon the times that it received from devices 32-34 and NTP server 35. In step 309, iDRAC 31 validates the accuracy of the time from each device. In step 310, iDRAC 310 selects one of the times to be used as a unified system time.

Message 311 is an SPDM request message sent by iDRAC 31 to smart devices 32, 33, 34 to set the unified system time that was selected in step 310. This may be a GET_ENCAPSULATED_REQUEST request message, for example. In messages 312, smart devices 32, 33, 34 send an SPDM response message to iDRAC 31 with the currently set time. These may be ENCAPSULATED_REQUEST response messages, for example. iDRAC 31 then validates the time difference by parsing the ENCAPSULATED_REQUEST response messages to determine what time was set at each device 32, 33, 34.

In message 313, iDRAC 31 may update or correct the time set at devices 32, 33, 34. For example, iDRAC 31 may send an SPDM DELIVER_ENCAPSULATED_RESPONSE message with an updated time or a corrected time adjustment.

Figure 4:
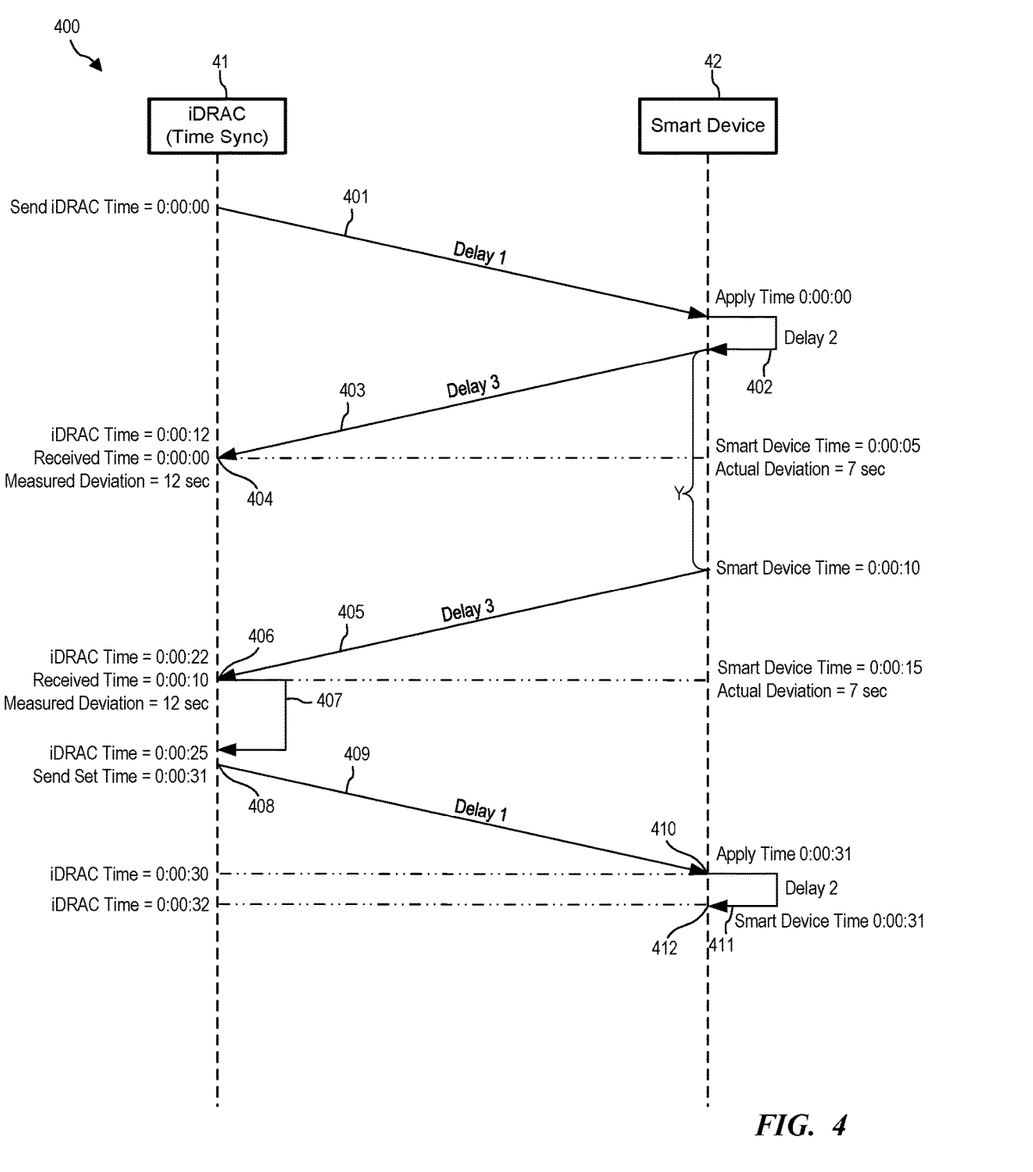
FIG. 4 illustrates a message flow showing messages exchanged between a BMC and a Smart Device as part of a autocorrect and synchronization algorithm for use when setting a system time.

FIG. 4 illustrates a message flow 400 showing messages exchanged between an iDRAC 41 and a Smart Device 42 as part of a autocorrect and synchronization algorithm for use when setting a system time. This message flow allows iDRAC 41 to determine if there is a difference between the time the iDRAC 41 sets and the time it receives from Smart Device 42. iDRAC 41 then compensates for delays in the system to ensure all components, including Smart Device 42, are using the same time.

In message 401, iDRAC 41 sends its current time (for example, T=0:00:00) to Smart Device 42. Message 401 has a forward propagation delay (Delay 1) as it travels from iDRAC 41 to Smart Device 42. For example, forward propagation Delay 1 may be 5 seconds. Upon receipt of message 401, Smart Device 42 applies the time (T=0:00:00) internally 402. There can be slight delay (Delay 2) due to internal processing of the set-time request by Smart Device 42. For example, Delay 2 may be 1 to 2 seconds.

Smart Device 42 sends its current time to iDRAC 41 in message 403. The time sent in message 403 is T=0:00:00, which is the time set by Smart Device 42. Message 403 has a backward propagation delay (Delay 3). In one arrangement, the backward propagation Delay 3 may be 5 seconds. At time 404, when iDRAC 41 receives the Smart Device time (0:00:00), the actual iDRAC internal time is 0:00:12. This corresponds to the initial iDRAC time plus delays (Delay1+Delay 2+Delay 3=5+2+5=12 seconds). At the same time, Smart Device 42 will have an internal time of 0:00:05. This corresponds to the initial set time plus reverse propagation Delay 3.

Accordingly, at time 404, there is a measured deviation of 12 seconds between the current actual time at iDRAC 41 and the time reported to iDRAC 41 in received message 403. Also, there is an actual deviation of 7 seconds between the current time at Smart Device 42 and the time reported to iDRAC 41 in received message 403.

Smart Device 42 then waits for predefined time Y, which may be 10 seconds in one example, before sending message 405. In message 405, Smart Device 42 reports a current time of 0:00:10 to iDRAC 41. Message 405 is also subject to the backward propagation Delay 3 of 5 seconds. At time 406, when iDRAC 41 receives the Smart Device time (0:00:10), the actual iDRAC internal time is 0:00:22. This corresponds to the initial iDRAC time plus delays (Delay1+Delay 2+Delay 3+Y=5+2+5+10=22 seconds). At the same time, Smart Device 42 will have an internal time of 0:00:15. This corresponds to the initial set time (0:00:00) plus reverse propagation Delay 3 plus offset Y (0+5+10=15).

At time 406, there is a measured deviation of 12 seconds between the current actual time at iDRAC 41 and the time reported to iDRAC 41 in received message 405. Also, there is an actual deviation of 7 seconds between the current time at Smart Device 42 and the time reported to iDRAC 41 in received message 405.

At step 407, iDRAC 41 confirms that the measured deviation is consistent for both received messages 403, 405 (i.e., there is a 12 seconds deviation associated with both messages. If the measured deviation differs after each received message 403, 405, then iDRAC 41 will wait for another predefined time Y to receive another response message (not shown) with a new time from Smart Device 42 to reevaluate whether there are changes in the measured deviation. iDRAC 41 may observe a number of received messages until the measured deviation is consistent between sequential messages.

When the measured deviation between sequential received messages from Smart Device 41 is consistent, then iDRAC 41 derives a new time value to be used in setting the time for Smart Device 42. The new time value is determined as the current iDRAC time value plus one-half of the measured deviation. In the example of FIG. 4, half of the measured deviation is 6 seconds. At time 408, the current iDRAC time value is 0:00:25, and iDRAC 41 sends a new set-time message 409 using set time 0:00:31 (i.e., 0:00:25+6 secs=0:00:31).

At time 410, Smart Device 42 receives the new set-time message 409 and applies the new time (0:00:31) internally. Since message 409 is subject to Delay 1 (5 seconds), the actual iDRAC time upon receipt at Smart Device 42 is 0:00:30 (i.e., 0:00:25+5 seconds). There can be slight delay (Delay 2) due to internal processing 411 of the set-time request by Smart Device 42. For example, Delay 2 may be 1 to 2 seconds. At time 412, when Smart Device 42 has set the internal time as 0:00:31, the corresponding iDRAC time is 0:00:32 (i.e., iDRAC time at 408+Delay1+2=0:00:25+5+2=0:00:25+7 seconds).

Accordingly, at time 412, the iDRAC 41 current time is 0:00:32, and the Smart Device 42 current time is 0:00:31, which gives an actual deviation between the two devices of 1 second. Using this algorithm, the actual deviation between the time at iDRAC 41 and at Smart Device 42 has been reduced from 7 seconds to 1 second.

In one arrangement, a server or IHS comprises a host processor module configured to host one or more processors and two or more smart devices, a secure control module configured to host a baseboard management controller, and a secure control interface configured to support communication between the secure control module and the host processor module. The baseboard management controller comprises at least one processor coupled to at least one memory, the at least one memory having program instructions stored thereon that, upon execution by the at least one processor, cause the baseboard management controller to retrieve a current time from each of the smart devices, validate the current time for each of the smart devices, identify a selected current time to be applied to each of the smart devices, and send the selected current time to each of the smart devices. The baseboard management controller is an SPDM-enabled device. The baseboard management controller sends the selected current time using an SPDM GET_ENCAPSULATED_REQUEST message. The selected current time is used to synchronize each of the smart devices. Each of the smart devices is coupled to a time source that provides the current time that smart device. The time source for each smart device is selected from an RTC, an NTP server, a GNSS, and/or a PTP system.

The baseboard management controller is an SPDM-enabled device. The baseboard management controller sends an SPDM GET_CERTIFICATE message to each smart device to collect a hardware identity for each smart device. The baseboard management controller sends an SPDM GET_CAPABILITIES message to each smart device to identify a time source for each smart device.

In another embodiment, a server or IHS comprises a first SPDM-enabled device conforming to the SPDM specification. The first SPDM-enabled device comprises at least one processor coupled to at least one memory, the at least one memory having program instructions stored thereon that, upon execution by the at least one processor, cause the IHS to send a first message comprising a first set time to a smart device, receive a second message comprising a first current time for the smart device, receive a third message comprising a second current time for the smart device, identify a consistent deviation between a system time and a smart device current time using information from the second message and the third message, and send a fourth message comprising a second set time to the smart device, wherein the second set time is calculated by adding a fraction of the consistent deviation to a system time.

The first SPDM-enabled device is a baseboard management controller. The baseboard management controller further comprises a time synchronization daemon configured to send the first through fourth messages and to calculate the second set time. The first SPDM-enabled device uses SPDM GET_ENCAPSULATED_REQUEST messages to send the first set time and the second set time.

The smart device is a SPDM-enabled device that is configured to apply the first set time, send the second message after a first processing delay, send the third message after a predefined time, and apply the second set time. The smart device uses SPDM ENCAPSULATED_REQUEST response messages to send the second and third messages.

The system time is selected as most accurate from among two or more times obtained from IHS components. The fraction of the consistent deviation to the system time is equal to one half of a measured deviation between a reported smart device time and the system time.

In another arrangement, a computer program product comprises a non-transitory computer readable storage medium having program instructions stored thereon that, upon execution by an IHS, cause the IHS to retrieve a current time from a plurality of devices using messages that comply with an SPDM standard, validate the current time for each of the devices, identify a selected current time to be applied to each of the devices, and send the selected current time to each of the devices using messages that comply with the SPDM standard. The IHS comprises a baseboard management controller that is configured to generate and receive SPDM messages to collect time data from IHS devices. The devices are SmartNIC devices. The devices are each coupled to a time source that provides the current time that device. The time source for each device is selected from an RTC, an NTP server, a GNSS, and/or a PTP system.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An Information Handling System (IHS), comprising:
a host processor module configured to host one or more processors and two or more smart devices;
a secure control module configured to host a baseboard management controller;
a secure control interface configured to support communication between the secure control module and the host processor module; and
wherein the baseboard management controller comprises at least one processor coupled to at least one memory, the at least one memory having program instructions stored thereon that, upon execution by the at least one processor, cause the baseboard management controller to:
retrieve a current time from each of the smart devices;
validate the current time for each of the smart devices;
identify a selected current time to be applied to each of the smart devices; and
send the selected current time to each of the smart devices.

2. The IHS of claim 1, wherein the baseboard management controller is a Security Protocol and Data Model (SPDM)-enabled device, and wherein the baseboard management controller sends the selected current time using an SPDM GET_ENCAPSULATED__REQUEST message.

3. The IHS of claim 1, wherein the selected current time is used to synchronize each of the smart devices.

4. The IHS of claim 1, wherein each of the smart devices is coupled to a time source that provides the current time to that smart device.

5. The IHS of claim 4, wherein the time source for each smart device is selected from a Real-Time Clock (RTC), a Network Time Protocol (NTP) server, a Global Navigation Satellite System (GNSS), and PTP (Precision Time Protocol) system.

6. The IHS of claim 1, wherein the baseboard management controller is a Security Protocol and Data Model (SPDM)-enabled device, and wherein the baseboard management controller sends an SPDM GET_CERTIFICATE message to each smart device to collect a hardware identity for each smart device.

7. The IHS of claim 6, wherein the baseboard management controller sends an SPDM GET_CAPABILITIES message to each smart device to identify a time source for each smart device.

8. An Information Handling System (IHS) comprising:
a first Security Protocol and Data Model (SPDM)-enabled device conforming to a SPDM specification, wherein the first SPDM-enabled device comprises at least one processor coupled to at least one memory, the at least one memory having program instructions stored thereon that, upon execution by the at least one processor, cause the IHS to:
send a first message comprising a first set time to a smart device;
receive a second message comprising a first current time for the smart device;
receive a third message comprising a second current time for the smart device;
identify a consistent deviation between a system time and a smart device current time using information from the second message and the third message; and
send a fourth message comprising a second set time to the smart device, wherein the second set time is calculated by adding a fraction of the consistent deviation to a system time.

9. The IHS of claim 8, wherein the first SPDM-enabled device is a baseboard management controller.

10. The IHS of claim 9, wherein the baseboard management controller further comprises a time synchronization daemon configured to send the first through fourth messages and to calculate the second set time.

11. The IHS of claim 8, wherein the first SPDM-enabled device uses SPDM GET_ENCAPSULATED_REQUEST messages to send the first set time and the second set time.

12. The IHS of claim 8, wherein the smart device is a SPDM-enabled device that is configured to:
apply the first set time;
send the second message after a first processing delay;
send the third message after a predefined time; and
apply the second set time.

13. The IHS of claim 12, wherein the smart device uses SPDM ENCAPSULATED_REQUEST response messages to send the second and third messages.

14. The IHS of claim 8, wherein the system time is selected as most accurate from among two or more times obtained from IHS components.

15. The IHS of claim 8, wherein the fraction of the consistent deviation to the system time is equal to one half of a measured deviation between a reported smart device time and the system time.

16. An Information Handling System (IHS), comprising:
a host processor module configured to host one or more processors and two or more devices;
a control module configured to host a baseboard management controller;
a control interface configured to support communication between the control module and the host processor module; and
wherein the baseboard management controller comprises at least one processor coupled to at least one memory, the at least one memory having program instructions stored thereon that, upon execution by the at least one processor, cause the baseboard management controller to:
retrieve a current time from each of the devices;
validate the current time for each of the devices;
identify a selected current time to be applied to each of the devices; and
send the selected current time to each of the devices.

17. The IHS of claim 16, wherein the baseboard management controller retrieves the current time from each of the devices using messages that comply with a Security Protocol and Data Model (SPDM) standard.

18. The IHS of claim 16, wherein the baseboard management controller sends the selected current time to each of the devices using messages that comply with a Security Protocol and Data Model (SPDM) standard.

19. The IHS of claim 16, wherein the control module is a secure control module.

20. The IHS of claim 16, wherein the control interface is a secure control interface.

\* \* \* \* \*